(12) United States Patent
Amato

(10) Patent No.: US 7,343,424 B2
(45) Date of Patent: Mar. 11, 2008

(54) FIBONACCI HEAP FOR USE WITH INTERNET ROUTING PROTOCOLS

(75) Inventor: Nicholas Amato, Concord, CA (US)

(73) Assignee: NextHop Technologies, Inc., Ann Arbor, MI (US)

( * ) Notice: Subject to any disclaimer, the term of this patent is extended or adjusted under 35 U.S.C. 154(b) by 310 days.

(21) Appl. No.: 10/506,596

(22) PCT Filed: Jun. 20, 2003

(86) PCT No.: PCT/US03/19674

§ 371 (c)(1),
(2), (4) Date: Sep. 3, 2004

(87) PCT Pub. No.: WO04/001621

PCT Pub. Date: Dec. 31, 2003

(65) Prior Publication Data

US 2005/0108424 A1    May 19, 2005

Related U.S. Application Data

(60) Provisional application No. 60/390,576, filed on Jun. 21, 2002.

(51) Int. Cl.
*G06F 15/173* (2006.01)
(52) U.S. Cl. ............... 709/241; 709/239; 709/240; 709/242; 370/238
(58) Field of Classification Search ........ 709/238–242; 370/255, 428, 238
See application file for complete search history.

(56) References Cited

U.S. PATENT DOCUMENTS 5,570,466 A * 10/1996 Oechsle ............... 709/238
6,098,107 A * 8/2000 Narvaez-Guarnieri et al. ............... 709/239

(Continued)

OTHER PUBLICATIONS

Paolo Narvaez et al., "New Dynamic Algorithm for shortest Path Tree Computation", IEE/ACM Transactions on Networking, vol. 8, No. 6, Dec. 2000.*

(Continued)

*Primary Examiner*—Oanh Duong
(74) *Attorney, Agent, or Firm*—Perkins Coie LLP

(57) ABSTRACT

In accordance with an aspect of the invention, one or more shortest paths is determined through a portion of a computer network, from a source vertex to one or more destination vertices according to a link-state protocol. A graph representation of the network portion is processed. The graph representation includes nodes and edges representing the vertices and connections therebetween. The processing includes operating on the graph representation according to a Djkstra-like algorithm. A subset of the Djkstra-like algorithm processing includes candidate list processing, to maintain and operate upon a candidate list (OSPF, IS-IS) of nodes that have been visited in the Djkstra-like algorithm processing. Finally, the candidate list processing is optimized relative to standard Djkstra algorithm processing for the link-state protocol. The optimized candidate list processing may be, for example, such that the candidate list processing operates on a candidate list of nodes that is stored in a generic format, as a Fibonacci heap of Fibonacci nodes in a generic format that is independent of the link-state protocol. Furthermore, the candidate list processing may be accessible via a generic application programming interface (API). As a result, the candidate list processing is useable for various link-state protocols, including various link-state routing protocols such as OSPF and IS-IS.

8 Claims, 16 Drawing Sheets

U.S. PATENT DOCUMENTS

| | | | |
|---|---|---|---|
| 6,477,515 B1* | 11/2002 | Boroujerdi et al. | 706/14 |
| 6,992,988 B2* | 1/2006 | Reynders et al. | 370/255 |
| 7,062,743 B2* | 6/2006 | Kahng et al. | 716/13 |
| 2001/0032272 A1* | 10/2001 | Fujita | 709/241 |
| 2001/0033556 A1* | 10/2001 | Krishnamurthy et al. | 370/329 |
| 2002/0067693 A1* | 6/2002 | Kodialam et al. | 370/216 |
| 2002/0067720 A1* | 6/2002 | Garcia-Luna-Aceves et al. | 370/389 |
| 2002/0141345 A1* | 10/2002 | Szviatovszki et al. | 370/238 |
| 2002/0141346 A1* | 10/2002 | Garcia-Luna-Aceves et al. | 370/238 |
| 2002/0172157 A1* | 11/2002 | Rhodes | 370/238 |
| 2003/0005149 A1* | 1/2003 | Haas et al. | 709/238 |
| 2003/0026268 A1* | 2/2003 | Navas | 370/400 |
| 2003/0043756 A1* | 3/2003 | Reynders et al. | 370/254 |
| 2003/0165117 A1* | 9/2003 | Garcie-Luna-Aceves et al. | 370/238 |
| 2003/0185209 A1* | 10/2003 | Lee | 370/390 |
| 2003/0185226 A1* | 10/2003 | Tang et al. | 370/428 |

OTHER PUBLICATIONS

Dong et al., "Accuulative Competition Neural Network for Shortest Path Tree Computation", Proceedings of the second International Conference on Machine Learning and Cybernetics, Xian, Nov. 2-5, 2003.*

Xiao et al., "Dynamic Shortest Path Tree Update for Multiple Link State Decrements", Apr. 2007.*

Fredman et al., "Fibonacci Heaps and Their Uses in Improved Network Optimization Algorithm", Journal of the Association for Computing Machinery, vol. 34, No. 3, Jul. 1987.*

* cited by examiner

Heap operates only on Fibheap Nodes

Fibonacci Heap Node

Heap Instance Structure

1.

2.

3.

FIBONACCI HEAP FOR USE WITH INTERNET ROUTING PROTOCOLS

This application is Rule 371 filing of International Application PCT/US2003/019674, which was filed on Jun. 20, 2003, and which claims priority to U.S. Provisional Patent Application No. 60/390,576, which was filed on Jun. 21, 2002, both of which are incorporated herein in their entirety by reference.

TECHNICAL FIELD

The present application relates to Fibonacci heaps and, in particular to a specialized Fibonacci heap concept that is suited for application to Internet link-state protocols that use a Dijkstra-like algorithm to determine shortest paths through a portion of a computer network.

BACKGROUND

Information in the Internet is transmitted as packets. A packet in the Internet is a fixed-length piece of data that is individually routed hop-by-hop from source to destination. The action of routing a packet means that each router along the path examines header information in the packet and a local database in order to forward the packet to its next hop. This local database is typically called the Forwarding Information Base or FIB. Entries in the FIB, usually structured as a table, determine to where packets are forwarded. The FIB is derived from a collective database called a Routing Information Database or RIB. This RIB is a collection of all the routing information the router "knows"; an algorithm maps the entries (routes) in the RIB to those in the FIB, which is used for forwarding.

The RIB is typically built in two ways, which may be used together: (a) static configuration, and (b) dynamic routing protocols. These protocols may be further subdivided into two groups based on the part of the Internet in which they operate: exterior gateway protocols, or EGPs, are responsible for the dissemination of routing data between autonomous administrative domains, and interior gateway protocols, or IGPs, are responsible for dissemination of routing data within a single autonomous domain. Furthermore, two types of IGPs are in widespread use today: those that use a distance-vector type of algorithm and those that use the link-state method. This description addresses the application of an algorithm to optimize a computation performed in the operation of link-state IGPs.

SUMMARY

In accordance with an aspect of the invention, one or more shortest paths is determined through a portion of a computer network, from a source vertex to one or more destination vertices according to a link-state protocol. A graph representation of the network portion is processed. The graph representation includes nodes and edges representing the vertices and connections therebetween.

The processing includes operating on the graph representation according to a Djkstra-like algorithm. A subset of the Djkstra-like algorithm processing includes candidate list processing, to maintain and operate upon a candidate list of nodes that have been visited in the Djkstra-like algorithm processing.

Finally, the candidate list processing is optimized relative to standard Djkstra algorithm processing for the link-state protocol. The optimized candidate list processing may be, for example, such that the candidate list processing operates on a candidate list of nodes that is stored in a generic format, as a Fibonacci heap of Fibonacci nodes in a generic format that is independent of the link-state protocol. Furthermore, the candidate list processing may be accessible via a generic application programming interface. As a result, the candidate list processing is useable for various link-state protocols, including various link-state routing protocols such as OSPF and IS-IS.

DETAILED DESCRIPTION

Figure 1:
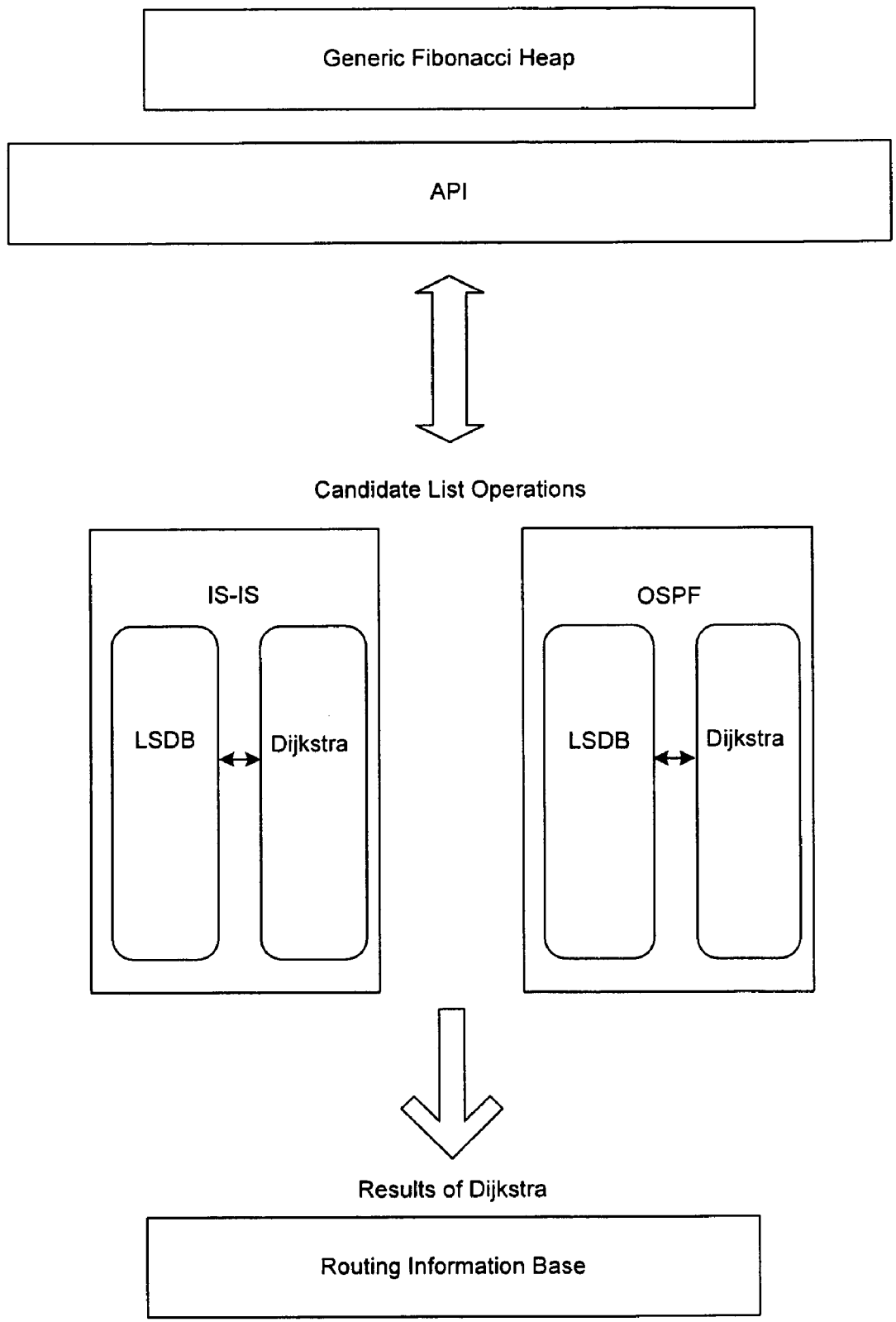
FIG. 1 broadly illustrates a data structure and shortest-path computation of a Dijkstra-like algorithm.

An object represented by a link-state protocol (such as a routing protocol) is either a multi-access network or a router. Networks may be connected to routers, but not to other networks. Routers may be connected to networks (by multi-access interfaces) or other routers (by different classes of point-to-point interfaces). Computer networks are a special case implementation of an abstract mathematical structure called a graph. That is, the graph represents the topology of the network. Link-state protocols allow routers to store an internal representation of the graph in a domain.

The graph includes vertices and edges, where vertices are either hosts (end systems that do not route packets not locally originated or destined) or routers (systems that may route packets to a "next hop"). Each edge connects a pair of vertices.

The IGP protocols define, at least broadly, four primary features:

Operation of flooding link-state information.
Structure of link-state information.
Algorithm for computing a shortest path tree.
Sub-protocols for neighbor acquisition and database synchronization, packet formats for communication.

Each router floods an "advertisement" (LSA, or link-state advertisement) describing its local connectivity. The protocol defines a flooding mechanism aimed at ensuring the data is transmitted throughout the domain, giving each participant the same view of the network. A standard algorithm is used to compute a shortest path tree on the resulting graph. This allows hop-by-hop routing to function, as all routers will have the same idea about what the shortest paths are in the network.

While these protocols operate on the abstract concept of a "graph," each protocol defines how the graph is represented and how to compute shortest path trees. "Shortest" typically means "least cost" where cost is determined using appropriate criteria (such as physical distance). Thus, in general, the definition of how the graph is represented differs among the protocols. The OSPF and IS-IS protocols are described in this document as examples.

Many link-state protocols use a Dijkstra-like algorithm to compute shortest paths. These algorithms refer to an abstract structure called a candidate list, which contains nodes that have been visited in the computation but to which it is not known if the shortest paths have been discovered. The implementation of the candidate list depends in part on which specific protocol is used. The list contains routers and hosts (vertices) or networks (edges). As defined by the protocol standards, the "list" is simply a set of routers and networks, and the standards do not otherwise require any particular representation of the set.

Use of a Fibonacci Heap in Link-State Protocols

In accordance with an aspect of the invention relating to link-state routing protocols, an implementation of an abstract algorithm is used to optimize the Dijkstra-like algorithm to the candidate list of routers and networks described in Internet link-state protocols. Each routing protocol uses a corresponding algorithm to compute a shortest path tree. The use of the Fibonacci heap greatly improves the speed of the computation, allowing the algorithm to be run more often and with fewer restrictions.

A generalized implementation of a Fibonacci heap is specially tailored for the algorithms used in Internet link-state protocols. In OSPF and IS-IS, this is the candidate list used in section 16.1 of RFC 2328 (OSPF Version 2) and section C.2.4 of ISO 10589 (Intermediate system to Intermediate system intra-domain routeing information exchange protocol for use in conjunction with the protocol for providing the connectionless-mode Network Service (ISO 8473)). Examples of special modifications are:

An generalized application programming interface ("API") designed to satisfy the needs of Internet link-state protocols while representing the list as a Fibonacci heap. The API is tailored to the specific needs of the shortest path computation in OSPF and IS-IS, for example.

Implementation of the algorithm's data structures so that the algorithm may operate generically on any link-state protocol objects (routers and networks in OSPF and IS-IS, for example).

Minimize or avoid recursion. Recursion is particularly disadvantageous on systems with limited stack space.

Allocation of the "auxiliary" array at initialization time. The array is a fixed size, the maximum base-2 log of the largest path metric expected in a shortest path computation.

Use of a comparison function to increase the usability of the heap on different data structures.

API

The generalized API includes the following operations:
Initialization
Insertion
Relax Key
Extract Minimum These operations are used in the computation of shortest path trees for the purpose of Internet routing. The API may operate on OSPF (Router and Network LSAs) or IS-IS (LSPs and Pseudonode LSPs) without code modifications; the API accepts generic descriptions of these structures (a "node") and operates on each in the same way, regardless of what the nodes represent. This allows the API to be used for multiple purposes, for example, in both OSPF and IS-IS.

In the initialization operation, the maximum sized auxiliary array is allocated according to a parameter to the initialization function.

Generic Data Structures

A data structure, described in more detail later, is provided as a general way of representing a piece of link-state information: for example, an OSPF Router LSA or Network LSA. This structure contains information specific only to the Fibonacci heap.

A node may be offset or otherwise referenced into a protocol-specific data structure, such as an LSA representation, by giving a value specifying an offset or other reference of the heap "key" to the initialization API call. This allows further operations to reference the key of the node without awareness of the protocol-specific data structures. The operations use the offset into the protocol-specific data structures to access data that is strictly related to the heap.

A recursive implementation of this algorithm can be impractical due to the limited amount of stack space on many systems. This implementation uses an iterative version of the "cutting" component of the Fibonacci heap algorithm.

As discussed above, Internet routing protocols such as OSPF (Open Shortest Path First) utilize a candidate list of nodes representing a set of vertices that have been visited in the Dijkstra-like computation. Each node contains some key which is a numeric value, for example, representing the currently-computed least cost from the source to the vertex represented by that node. A comparison function is stored in the Fibonacci heap instance structure. This function is called with two arguments, which are references to the keys of two nodes to be compared. The function returns 0, −1 or 1 to indicate the first key is equal to, lesser than or greater than the second key, respectively. Operations performed on the list may be summarized as initialization, insert, extract-minimum, and relax-key.

With the application of the specialized Fibonacci heap structure, the Dijkstra-like algorithm used to compute shortest path trees runs with $O(V \lg V+E)$ complexity, resulting in improved IP network scalability.

In operation, an algorithm and data structure are applied to the representation of a critical piece of the Dijkstra-like algorithm: the candidate list. The application of this algorithm and data structure results in increased scalability in link-state Internet routing protocols by making the shortest path (Dijkstra-like) computation more efficient. FIG. 1 shows an example of the functional placement of the algorithm and data structure.

Figure 2:
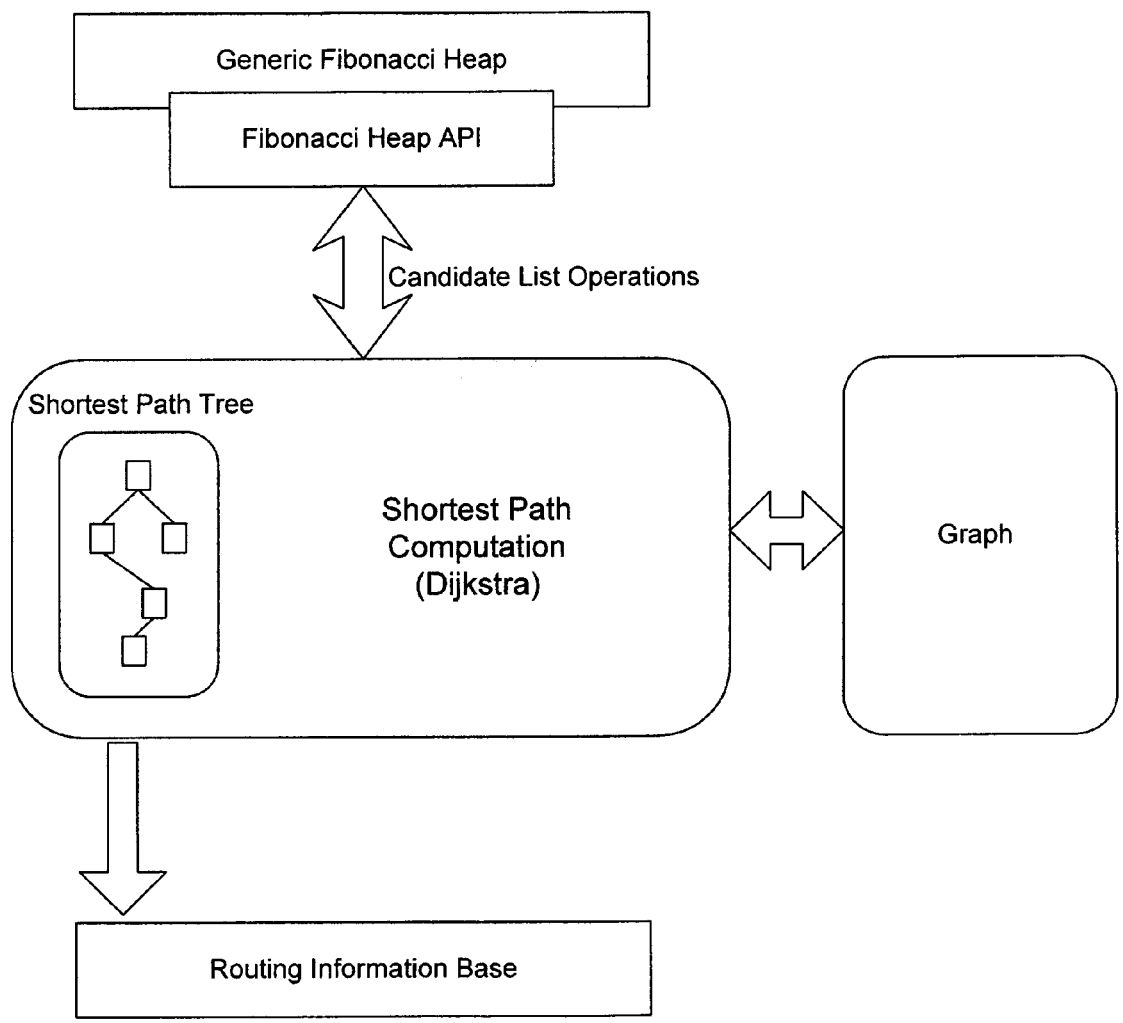
FIG. 2 illustrates in greater detail how the shortest path computation interfaces with a generic Fibonacci heap implementation of a candidate list.

FIG. 2 illustrates how the shortest path computation interfaces with a generic Fibonacci heap implementation. The computation takes as input a set of nodes representing vertices discovered through the flooding process, and outputs a set of shortest path(s) through the network.

Figure 3:
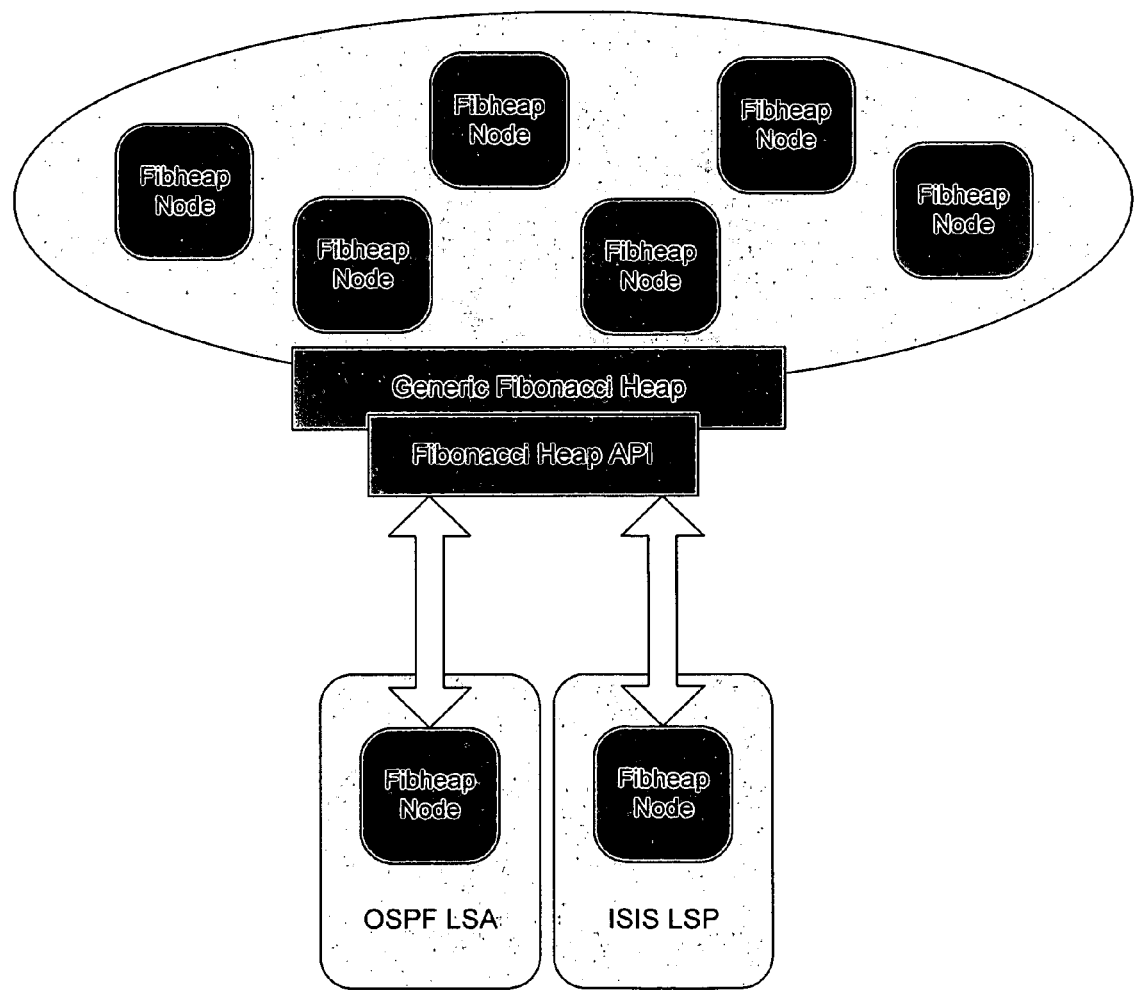
FIG. 3 illustrates the "generic" quality of the FIG. 2 candidate list implemented as a Fibonacci heap.

FIG. 3 illustrates the "generic" element of the implementation. That is, all IS-IS LSPs and OSPF LSAs and nodes are treated as Fibonacci heap nodes when passed through the API. The heap may serve multiple protocols, while at the same time minimizing complexity.

Figure 4:
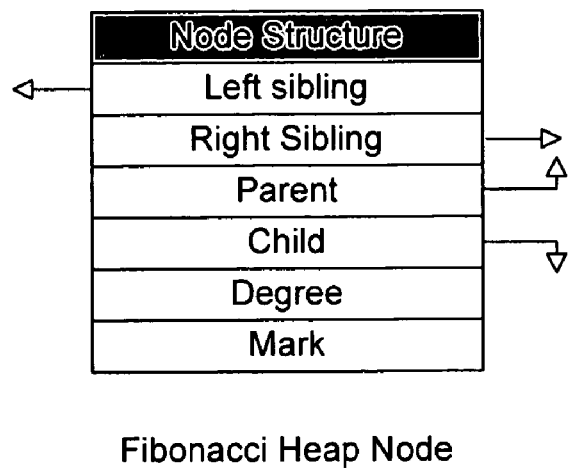
FIG. 4 illustrates a framework for one node entry of the Fibonacci heap candidate list.

Each vertex in the graph that has been discovered in the Dijkstra-like computation has an associated node entry in the candidate list, as illustrated in FIG. 4. Each field is further explained in Table 1. Each node is part of a circle queue of siblings and maintains a pointer to its parent.

TABLE 1

| Field | Purpose | Data Type |
|---|---|---|
| fn_left | Points to the left sibling in the circular queue of siblings of this node | Pointer |
| fn_right | Points to the right sibling in the circular queue of siblings of this node | Pointer |
| fn_parent | Points to the parent of this node | Pointer |
| fn_degree | Set to the number of children of this node | Integer |
| fn_mark | Set to 1 when a node is made a root, set to 0 when a node loses a child. Node is made root when it is losing a child and its mark is set to 1 | Boolean |

Figure 5:
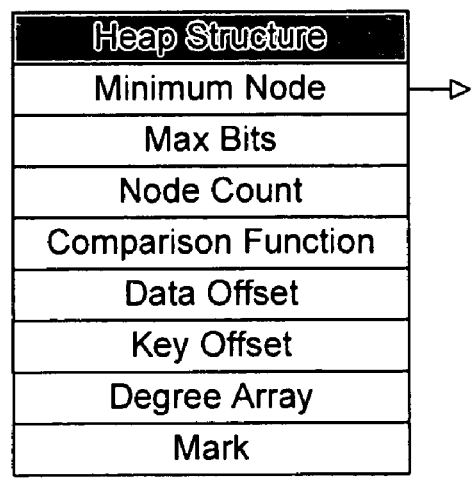
FIG. 5 illustrates a top-level structure of the FIG. 2 Fibonacci heap candidate list.

The candidate list is represented by the Fibonacci heap top-level structure as illustrated in FIG. 5, which represents an instance of a heap. One such structure is instantiated per list instance, for example, for each instance of a link-state protocol. A pointer to the circle queue of root nodes is maintained, which is the point of access to the list. The purpose of each field is explained in Table 2. In the description, field names and variable names are shown in bold.

TABLE 2

| Field | Purpose | Data Type |
|---|---|---|
| f_min | Points to the minimum cost node. Also used to access a circle queue of root nodes | Pointer |
| f_max_key_bits | Set (by API user) to lg (n) of the largest key | Integer |
| f_nnodes | Set to the number of nodes in the heap | Integer |
| f_cmp_func | Set (by API user) to a comparison function to return −1, 0, 1 indicating relationship between two supplied keys | Function pointer |
| f_dataoff | Offset of pointer in node that contains key | Pointer |
| f_keyoff | Offset of key in node | Pointer |
| f_degs | Buffer used internally | Pointer |
| f_mark | Mark set when first child lost, cleared when added to root queue | Boolean |

In all operations, moving a node to the root circle queue is accomplished by setting its fn_parent field to zero in addition to adding it to the queue pointed to by f_min of the owning heap.

Figure 6:
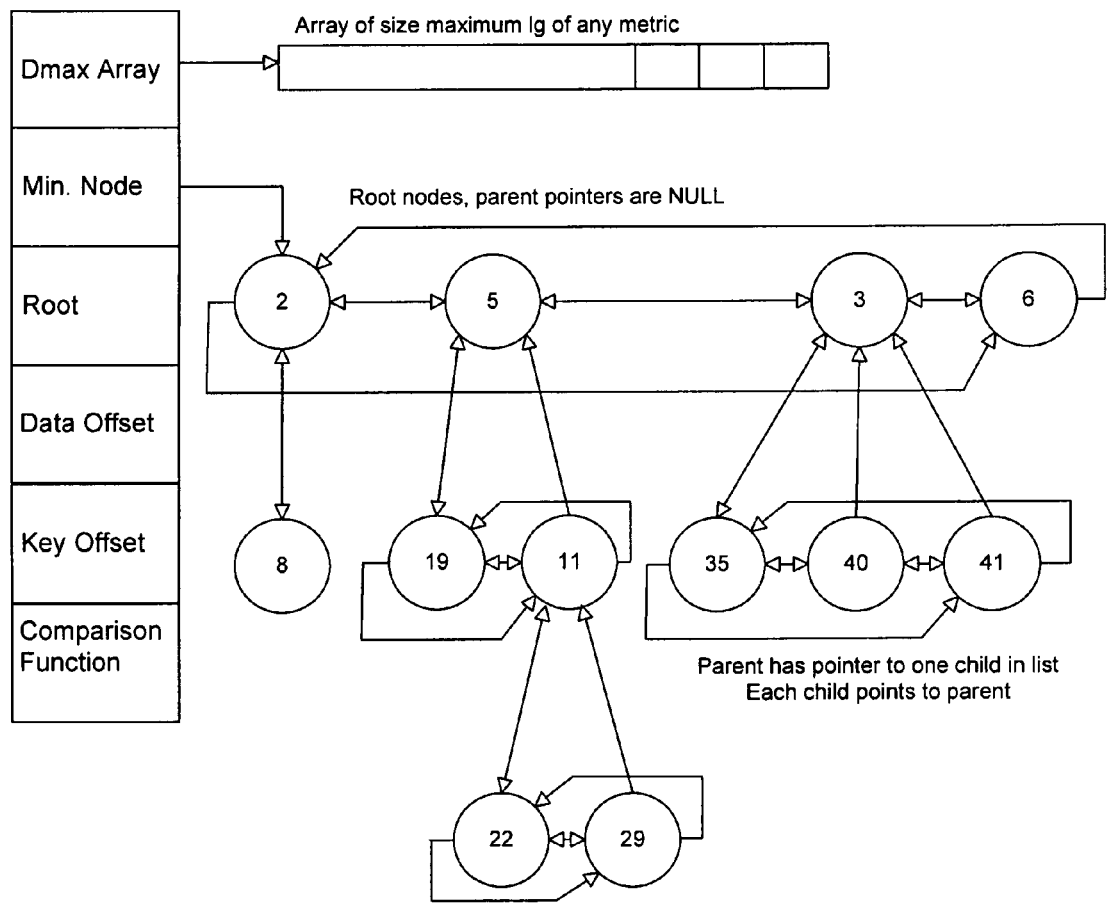
FIG. 6 illustrates a general layout of an instance of the FIG. 5 structure.

The general layout of an instance of the FIG. 5 structure is illustrated in FIG. 6. Some fields of the instance structure have been omitted in FIG. 6 for clarity of illustration.

We now describe an example of the Application Programming Interface (API) via which the Fibonacci heap structures are manipulated. In the description, variable names are shown in bold in addition to field names being shown in bold.

Figure 7:
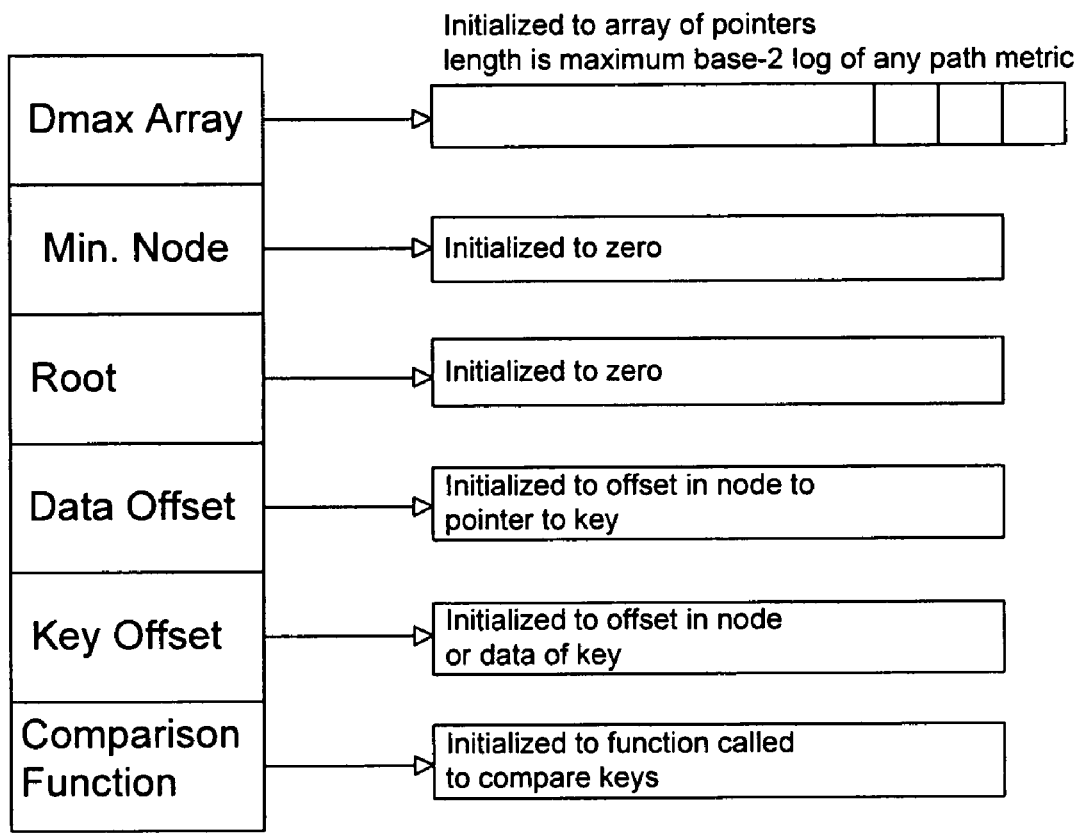
FIG. 7 illustrates an initialization operation accordance with embodiments of the invention.

Initialization Operation
  API Definition
    fibheap_init(heap, data_offset, key_offset, maxbits, comparison_function)
  Parameters
    heap—a pointer to the tree structure that represents an instance of a Fibonacci heap (see FIG. 5).
    data_offset—the offset of a pointer in the node that contains the data.
    key_offset—the offset of a pointer in the node that contains the key. This parameter may be zero, indicating that the key is an offset into the node itself
    maxbits—The maximum number of bits in any key, or the base-2 log of the maximum key.
    comparison_function—a pointer to a function used to compare two keys, which returns a value less than, equal to, or greater than zero indicating the relationship between the first and second key.
  Procedure
    1) The f_min and f_nnodes fields of the global fibheap_t are initialized to zero.
    2) The maxbits and comparison_function are used to initialize these values in the fibheap instance structure.
    3) An array of size maxbits pointers is allocated and stored in the instance structure.
  The initialization operation is illustrated in FIG. 7.

Figure 8:
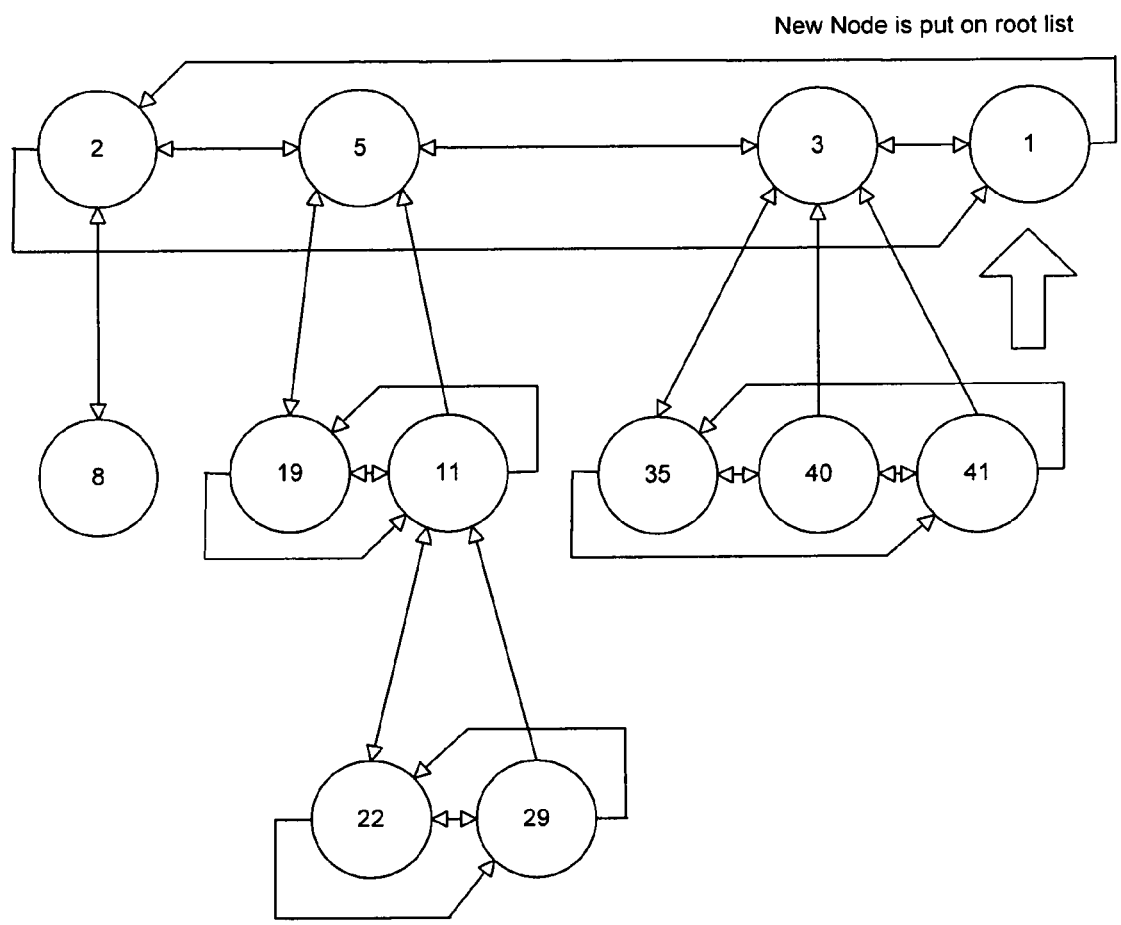
FIG. 8 illustrates insertion of a new node in a Fibonacci heap data structure in accordance with embodiments of the invention.
Figure 9:
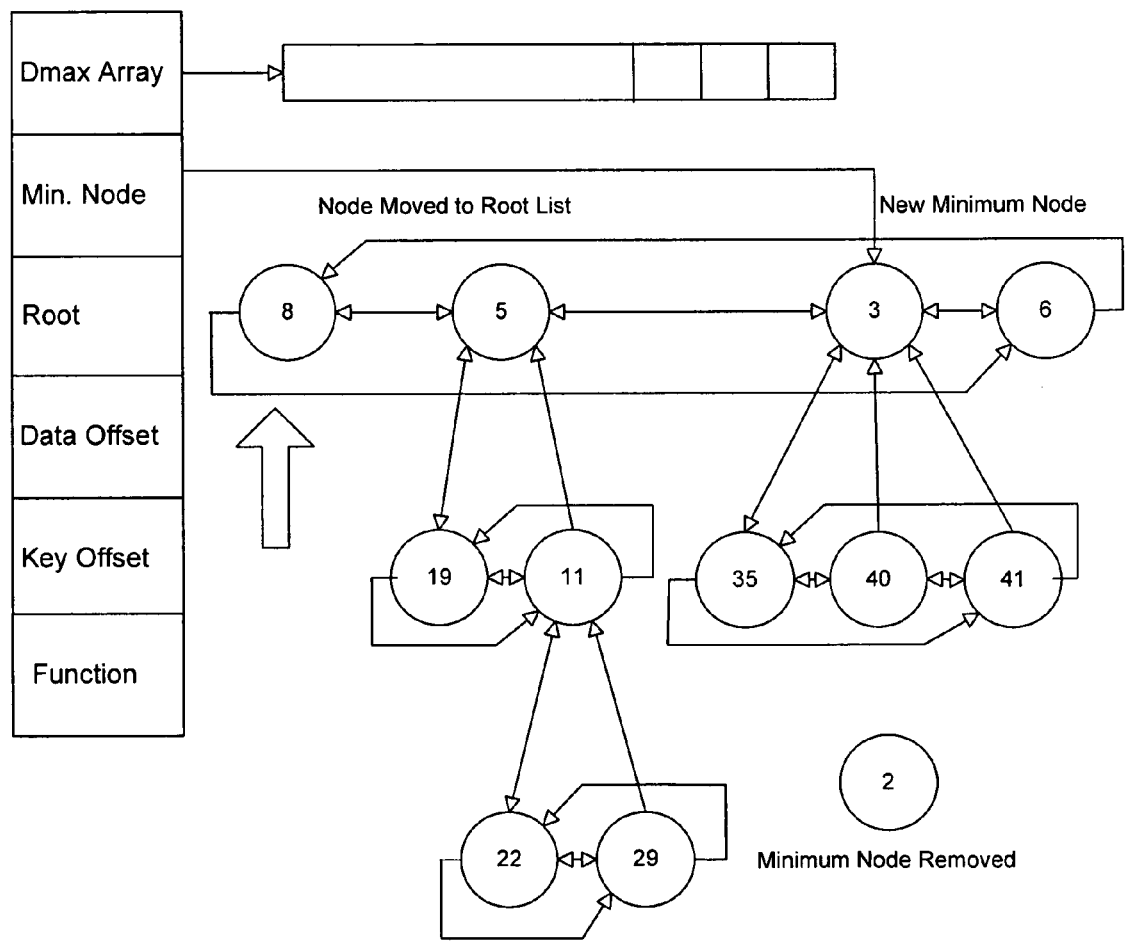
FIG. 9 illustrates steps in an extract-minimum operation in accordance with embodiments of the invention.
Figure 10:
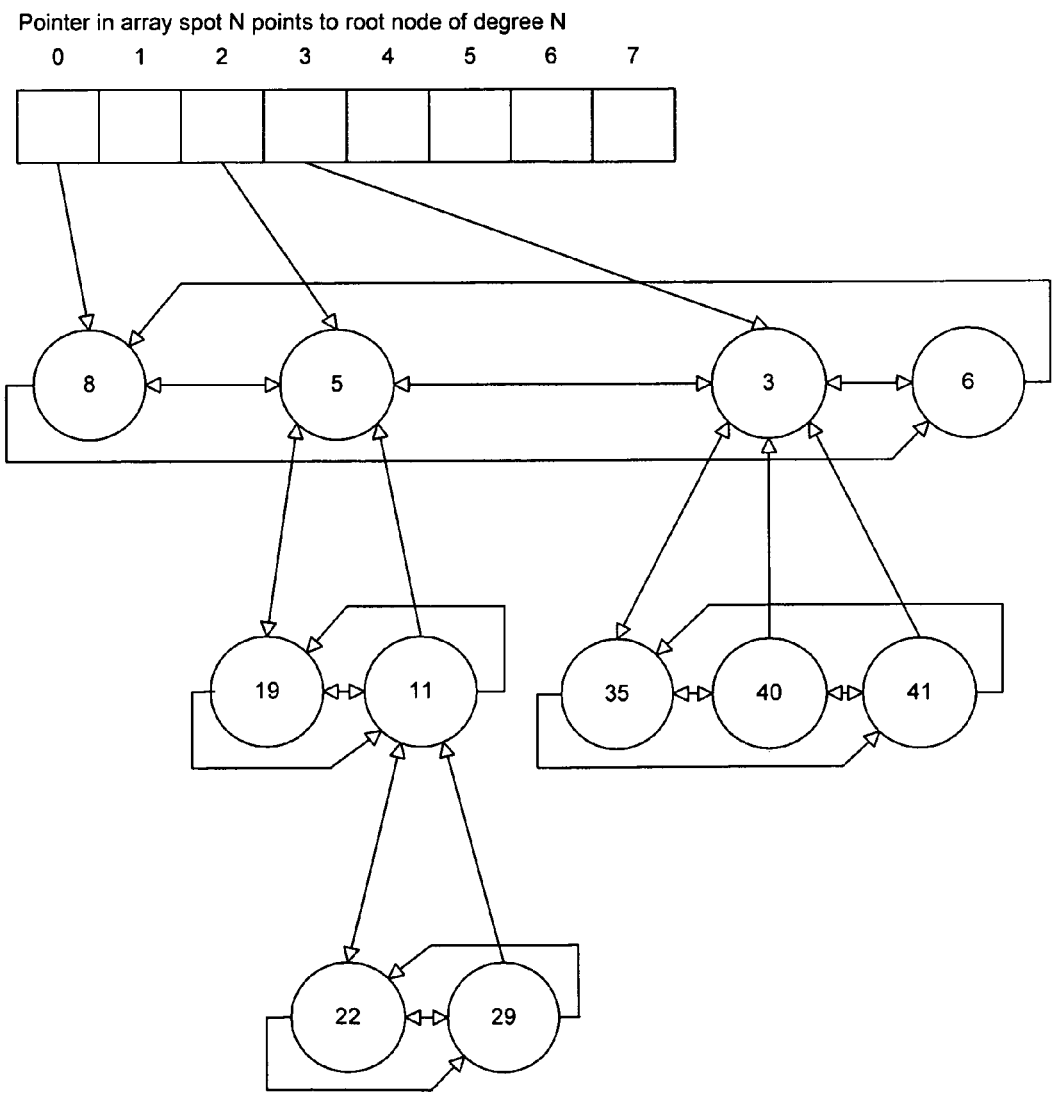
FIG. 10 illustrates certain steps in the extract-minimum operation in accordance with embodiments of the invention.
Figure 11:
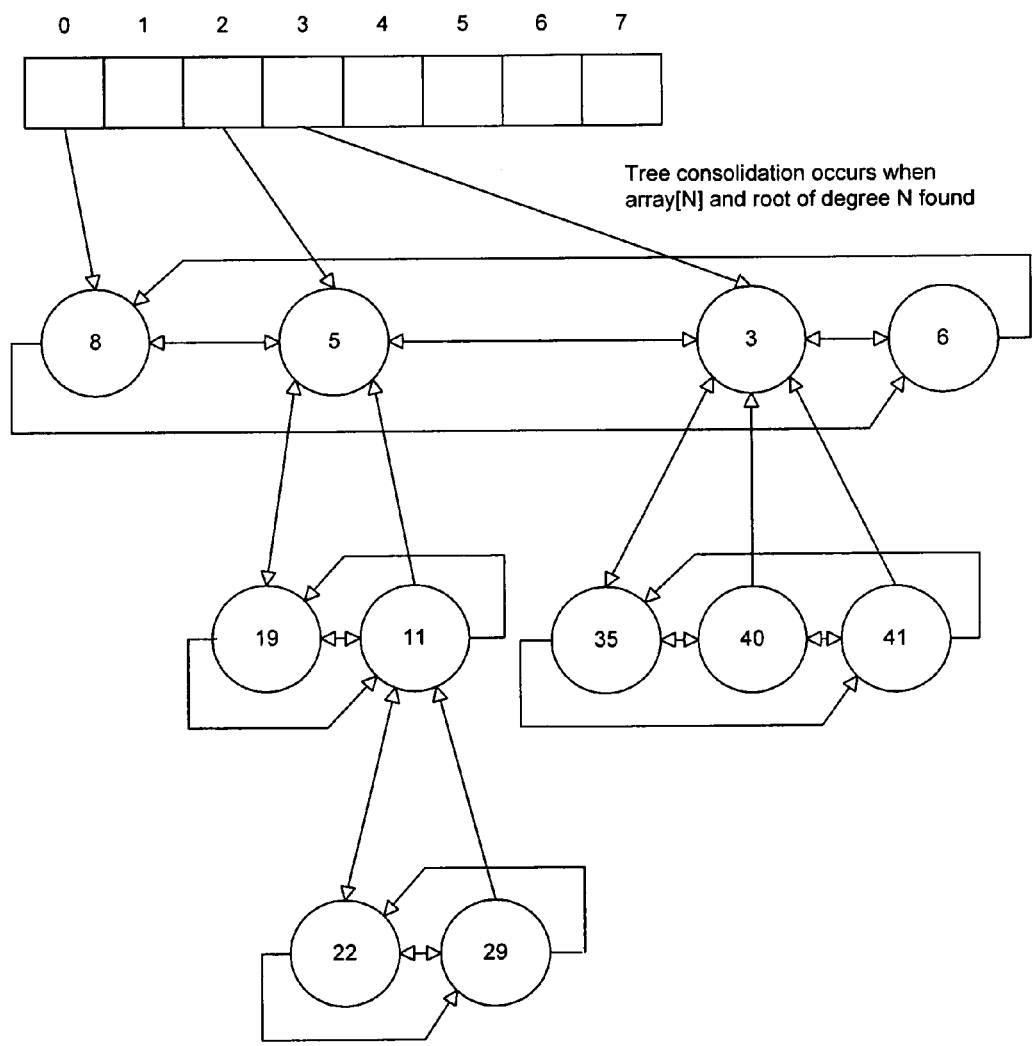
FIG. 11 illustrates tree consolidation within a Fibonacci heap data structure in accordance with embodiments of the invention.
Figure 12:
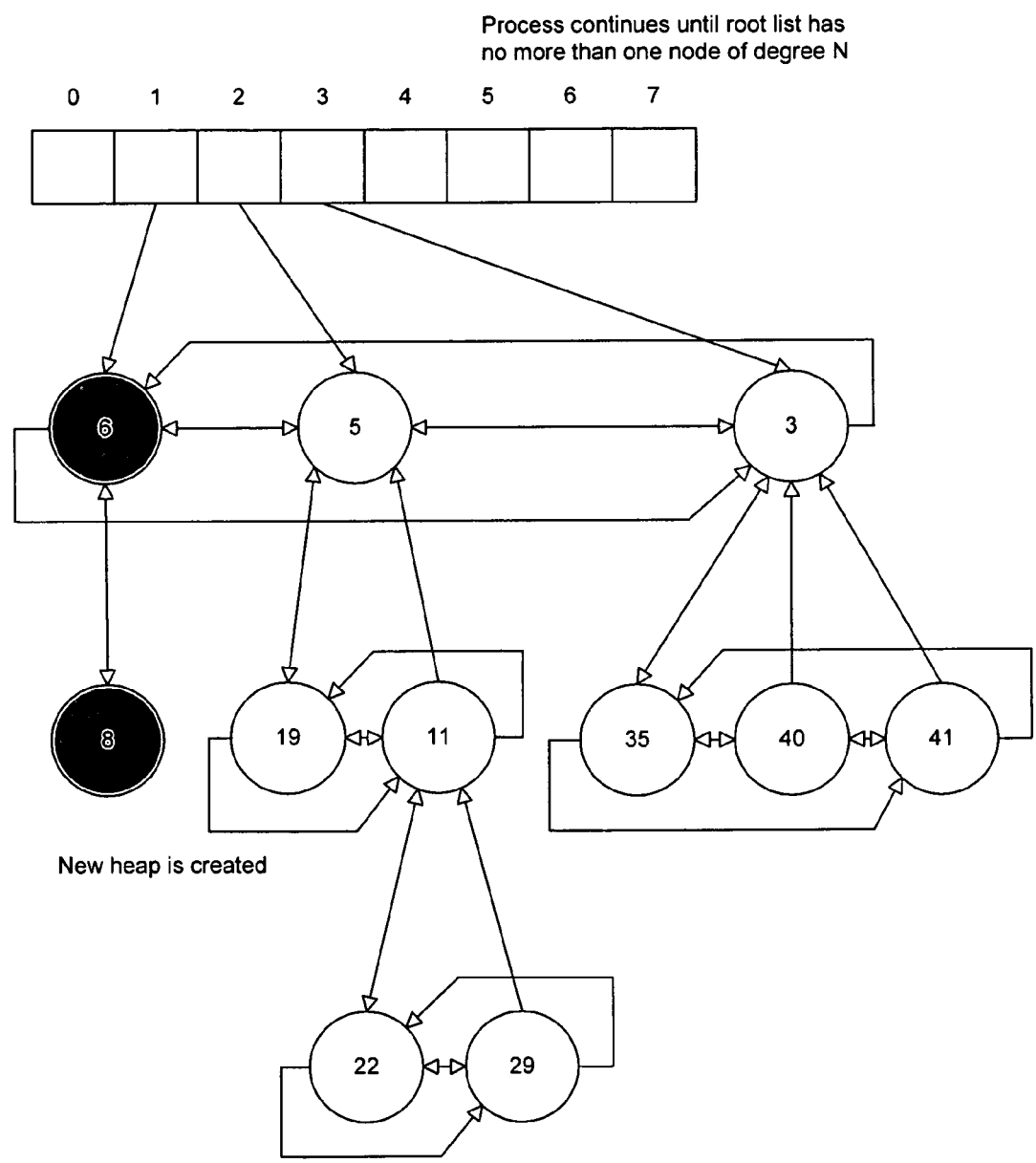
FIG. 12 illustrates the creation of a new heap in a Fibonacci heap data structure in accordance with embodiments of the invention.
Figure 13:
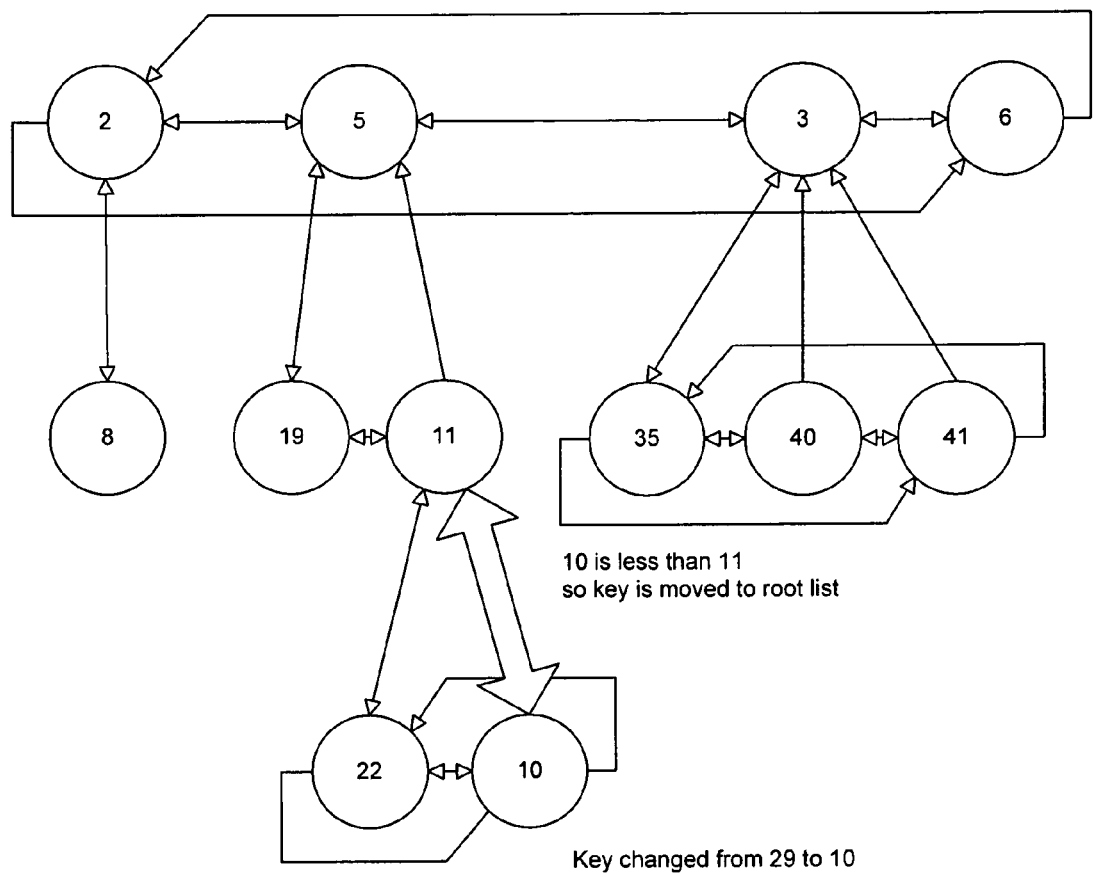
FIG. 13 illustrates an example of a relax key operation in accordance with embodiments of the invention.
Figure 14:
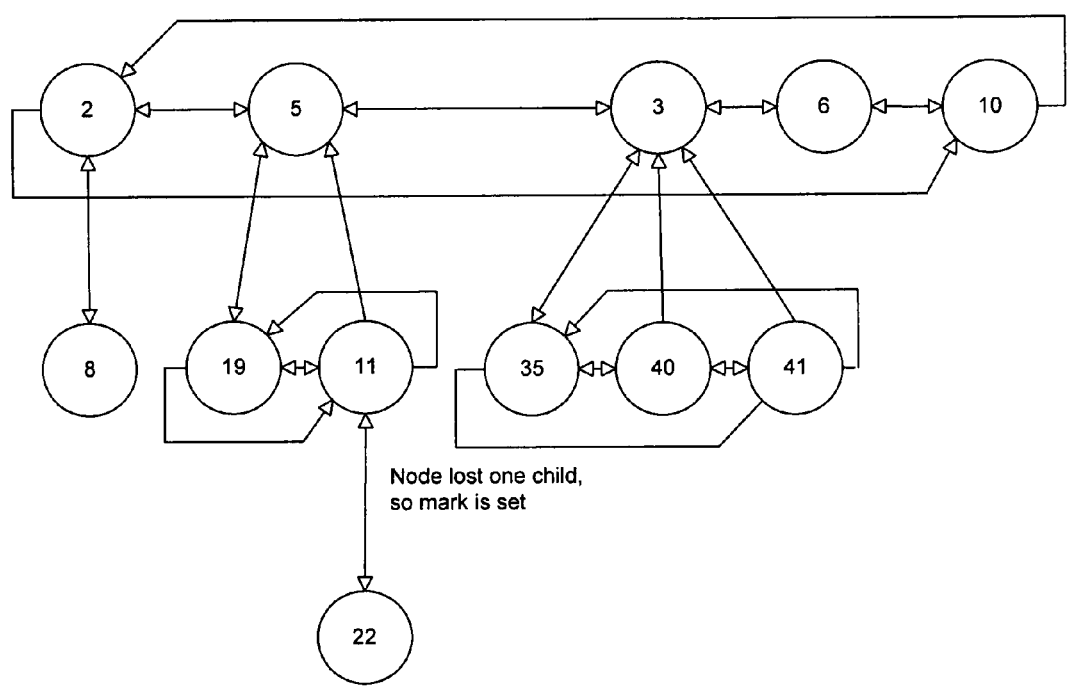
FIG. 14 illustrates steps in the relax key operation in accordance with embodiments of the invention.
Figure 15:
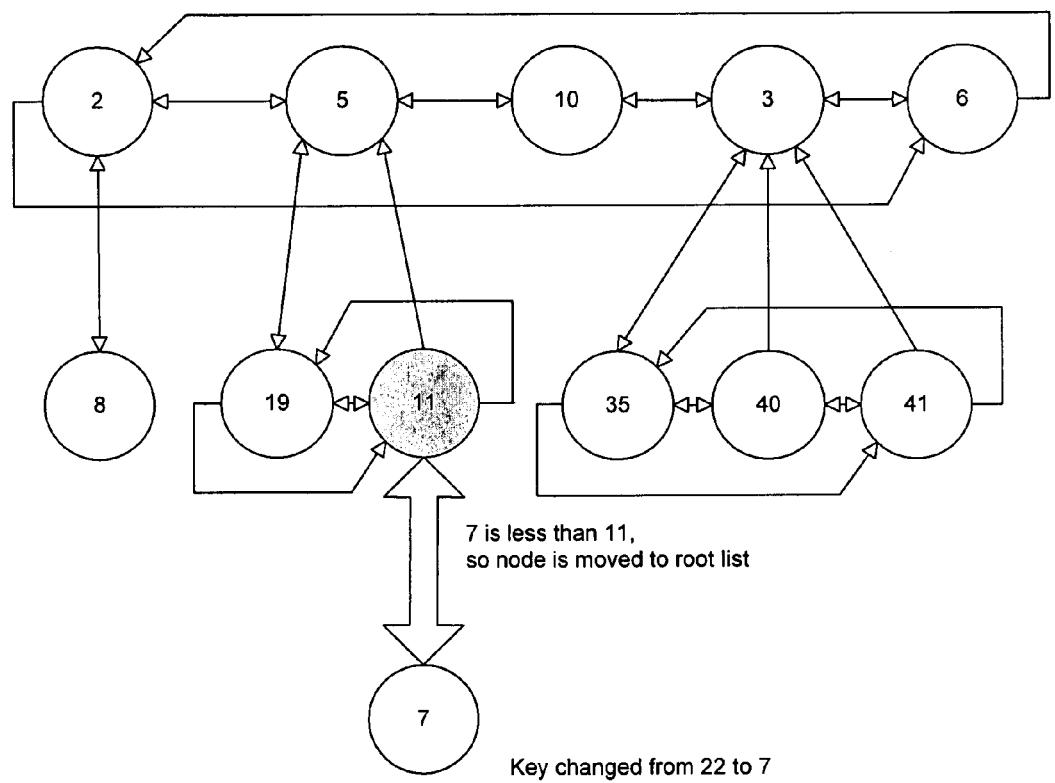
FIG. 15 illustrates certain steps in the relax key operation in accordance with embodiments of the invention.
Figure 16:
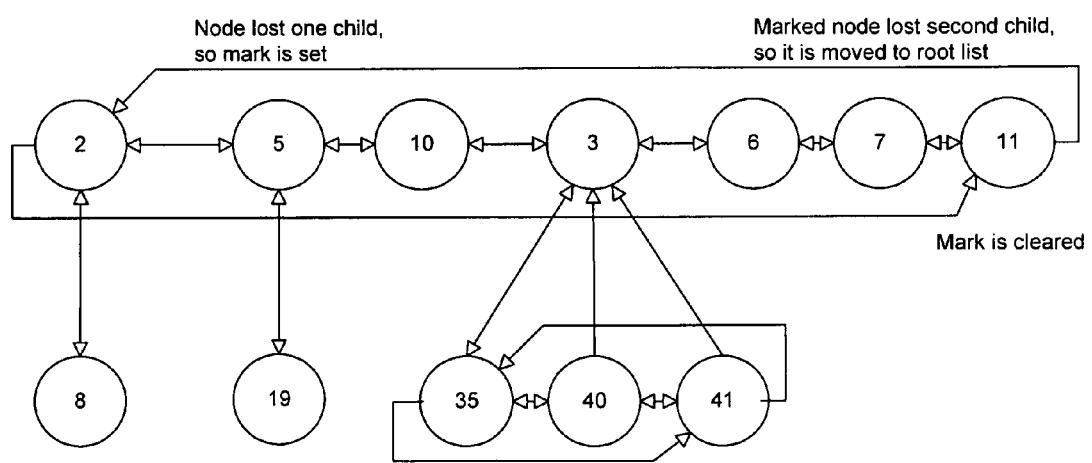
FIG. 16 illustrates additional steps in the relax key operation in accordance with embodiments of the invention.

Insert Operation
  API Definition
    fibheap_insert(tree, node)
  Parameters
    tree—a pointer to the heap instance structure (see FIG. 5).
    node—a pointer to a node structure (see FIG. 4).
  Procedure
    1) The new node is placed on the circle queue of root nodes, referenced by the minimum node pointer in the heap instance structure (see FIG. 5).
    2) The user-supplied comparison function is called with arguments node and the current minimum node. If this function returns a value less than zero, then the minimum pointer in the heap structure is set to point to node.
  An example of the insert operation is shown in FIG. 8.

Extract Minimum Operation
  API Definition
    fibheap_extract(heap);
    Returns the minimum node.
  Parameters
    heap—a pointer to the heap instance structure (see FIG. 5).
  Procedure
    1) The minimum node is removed from the circle queue.
    2) All of the children of this node are moved to the root circle queue.
    3) The heap is consolidated using the following procedure:
      a The buffer of size maxbits pointers (see FIG. 5) is initialized to zero.

b. The root circle queue is walked, setting the Nth entry in the array to point to a parent if its degree is N.
c. If there already exists an entry in N for this degree, then the heaps are merged, keeping the heap property (i.e., no child can be greater than its parent).
  i. When this occurs, the new heap of degree N+1 is now referenced by the N+1 entry in the array.
d. At the end of this procedure, the nodes referenced by the array form the root circle queue.
4) The new minimum is found by walking the root circle queue.
5) The number of nodes is decremented.
This operation is illustrated in FIGS. 9-12.

Relax Key Operation
API Definition
fibheap_key_changed(tree, node)
Parameters
tree—a pointer to a heap instance structure (see FIG. 5)
node—a pointer to a heap node structure (see FIG. 4)
Procedure
1. If the key of node is less than the key of the current minimum node, then node becomes the minimum node. The comparison is done with the function given in the initialization operation.
2. If node was on the root circle queue, then the operation terminates.
3. Else, if the key of node is smaller than its parent key, then node is moved to the root list.
4. The following procedure is iterated. Before the procedure starts, pnode is set to the parent of the node that was moved before its parent pointer was cleared.
  a) If pnode is not set to a valid node, the procedure terminates.
  b) If pnode's mark is not set, its mark is set and the procedure terminates.
  c) Else, pnode is moved to the root queue and its mark is cleared and pnode is set to the parent of pnode.

FIGS. 13-16 illustrate an iterative definition of a relax key operation of the FIG. 5 structure. This provides for a loop invariant of pnode, namely the parent of the node that was just examined. Having a single, looping procedure instead of the recursive definitions described below is advantageous in computing environments with limited resources.

The recursive definition of this operation defines cut and recursive-cut operations. The relax-key operation is then defined in terms of these operations, as follows:

If the key of node is less than the key of the parent node, then perform cut on node and recursive-cut on the parent of node.
Cut Operation (Node)
  a) Move node to the root queue and clear its mark.
Recursive-Cut Operation (Node)
  a) If node is zero, the procedure terminates.
  b) If node's mark is not set, its mark is set and the procedure terminates.
  c) Else, perform cut on node and recursive-cut on the parent of node.

Even though Dijkstra algorithms with Fibonacci heaps have been discussed in mathematical journals, it has been considered that actual implementations of the Fibonacci heaps would be slow and complex. Particular implementation details can be important to achieving speed with minimized complexity. We now describe examples of such implementation details. The described implementations are fast and have reduced complexity. Not only is IP route computation faster, but these implementations lend themselves to being scalable.

Theoretical vs. Practical Issues with Fibonacci Heaps

The determination of minimum weight spanning trees is a well-known graph problem. Widely proposed solutions to this problem include the Bellman-Ford[1], D'Esopo-Pape[2], and Dijkstra[3] algorithms. The Dijkstra algorithm is the basis for the routing computation in Internet link-state routing protocols, and is referred to here as the "Dijkstra-like" algorithm because each protocol defines a specific way of applying the algorithm. Fredman and Tarjan[4] proposed a Fibonacci heap as a new way of storing the candidate list used in the Dijkstra, and it is proposed that this improves the algorithm's theoretical worst-case bounds[5] to $O(V \lg V+E)$.

[1]R. Bellman, "On a routing problem", Q. Appl. Math, vol 16, pp. 87-90, 1958
[2]D. Berksekas, "Linear Network Optimizations: Algorithms and Codes", MA, Cambridge: MIT Press 1991
[3]E. Dijkstra, "A note two problems in connection with graphs", Numerical Math, vol. 1, pp. 269-271, 1959
[4]M. Fredman, R. Tarjan, "Fibonacci Heaps and their uses in improved network optimization algorithms", 1987, ACM 004-5411/87/0700-0596
[5]Cormen, Leiserson, Rivest, Introduction to Algorithms, MIT Press 1990, ISBN 0-262-03141-8, p The theoretical performance of the Fibonacci heap algorithm is promising, but experimental evidence has indicated that Fibonacci heaps are conventionally not useful in practice because they are complicated[6] and slow.[7] This may be summarized as:

[6]J. Stasko, J. Vitter, "Pairing Heaps", Experiments and Analysis", p 235 paragraph 2, 1987, Communications of the ACM, Volume 30 number 3
[7]Rajeev Raman, "A Summary of shortest-path results", December 1996, p 7.

"From a practical point of view, however, the constant factors and programming complexity of Fibonacci heaps make them less desirable than ordinary binary (or k-ary) heaps for most applications. Thus, Fibonacci heaps are predominantly of theoretical interest. If a much simpler data structure within the same amortized time bounds as Fibonacci heaps were developed, it would be of great practical use of well."[8]

[8]Cormen, Leiserson, Rivest, Introduction to Algorithms, MIT Press 1990, ISBN 0-262-03141-8, p 420.

We have addressed the practical limitations generally described as "programming complexity" and "constant factors" in a specialized domain: the shortest path computation in Internet link-state protocols. The result is a significant performance improvement in the link-state routing protocols. These factors are described below.

First, the general Fibonacci heap definition has a requirement of an "auxiliary array" which stores at least $D_{max}$ pointers to nodes, where $D_{max}$ is equal to the maximum log of the set of keys used. In accordance with an example, we allocate the auxiliary array initialization time based on a limited maximum log.

Recursive Definition

The general Fibonacci heap definition is recursive. In many environments, recursion is impractical. In accordance with an example, we make procedures iterative. For example, the "cut" operation, performed in the extract-minimum operation of the generalized API, effectively recursively examines the parent node to see if that node needs to be moved to the root queue. The example implementation sets the parent pointer of the roots on the node list to NULL, such that an iterative function may operate on ancestor nodes using a set parent pointer as a loop invariant.

Furthermore, many bookkeeping fields are utilized for maintenance of the tree, utilizing extra storage per node (e.g., for left and right sibling pointers and a parent pointer, along with the "mark" indicator). This is more storage than typically utilized with other data structures.

In accordance with one example, the "programming complexity" has been reduced and modularized for Internet link-state routing protocol domain, so improving the efficiency by which implementation can be utilized.

The conventional Fibonacci heap does not provide efficient support for node lookup based on cost or other keys. This is utilized for example, in part (2) step (d) of the routing computation in OSPF, as the candidate list node entry for a vertex is retrieved (i.e., it is determined whether there is a node entry on the candidate list for the vertex). We address this drawback in accordance with one example by keeping a pointer to the candidate list node entry structure for a vertex in the "owning" vertex, so the minimum-cost node may be retrieved without lookup.

The "extract min" operation may take longer than the insert or relax-key operations because of the tree consolidation that occurs immediately afterwards. While this may negatively affect some applications, notably those that need generally some guaranteed bounds on the components of the Dijkstra-like computation, it is not an issue for the domain of link-state routing protocols since the computation typically occurs all at once, if even for only a part of the spanning tree.

We now describe an example application of the Fibonacci heap algorithm and data structure to the shortest path computation in OSPF.

Candidate List Representation

Figure 17:
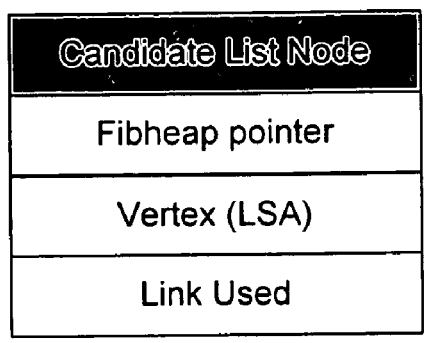
FIG. 17 illustrates a structure representing a candidate list referred to by section 16.1 of RFC 2328 for the OSPF Internet link-state protocol.

The candidate list referred to by section 16.1 of RFC 2328 is represented by a relatively simple structure shown in FIG. 17; the purpose of each field of the structure is explained in Table 3.

TABLE 3

| Field | Purpose | Data Type |
| --- | --- | --- |
| l_fnode | Fibonacci heap node | Pointer |
| l_vtx | Points back to the owning vertex (LSA) | Pointer |
| l_vl | Points to the incoming link used to reach the owning vertex (LSA) | Pointer |

The vertex_t structure represents a single OSPF LSA. This structure contains a pointer back to the cdtlist_t that represents this LSA in the heap. Since the heap does not support efficient lookup, this pointer provides for increased performance. The word node is used in this description interchangeably with LSA, meaning each node in the Fibonacci heap represents an LSA encountered in the shortest-path computation.

The next sections describe the algorithm including definitions of the API in ANSI C. The operations used by OSPF in section 16.1 are initialization, insert, extract-minimum, and relax-key. These are used in the example implementation of section 16.1 of RFC 2328 as follows.

In step 1, initialization is used to initialize the data structures used for the candidate list.

In step 2, part (d), bullet 3, if the cost D is less than the current cost for vertex W on the candidate list, relax-key is used to adjust the cost of W on the list. If W does not have an entry, insert is used to insert an entry for W on the list.

In step 3, the node in the candidate list with the least cost is chosen. The extract-minimum operation is used to extract the node entry in the candidate list with the smallest key.

In summary, the example Fibonacci heap algorithm is applied to a specific component of the specialized process in OSPF used to calculate IP routes. The use of the algorithm for the optimization of the algorithm in Section 16.1 of RFC 2328 results in dramatic scalability improvements and improved operational performance in an OSPF implementation by reducing the amount of time required to compute IP routes in an OSPF area.

We now turn to the Intermediate System to Intermediate System (IS-IS) protocol, as another example. The IS-IS protocol is a link-state protocol that uses mechanisms similar to those used in OSPF. The IS-IS protocol is described in ISO Standard 10589.

Link-state information is flooded in the form of LSPs (Link-State Packets). IS-IS uses a two-level routing hierarchy, dividing the domain into separate levels. The shortest path computation is run independently for level 1 and level 2. The results of these computations are used for the same purpose as in OSPF—to maintain forwarding state.

We now describe an application of an example Fibonacci heap algorithm and data structure to the shortest path computation in IS-IS. The algorithm used in IS-IS is generally described in Appendix C, section C.2.4 of ISO 10589.

TENT Entry Representation

A destination (network or router) discovered in the shortest path computation is an entry in TENT.

Figure 18:
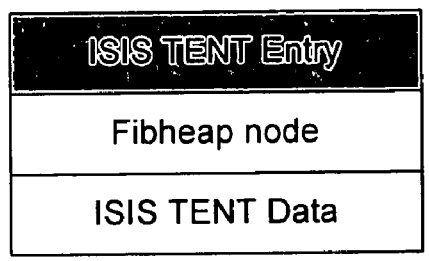
FIG. 18 illustrates a structure representing a TENT list according to an IS-IS Internet link-state protocol.

A subset of the fields relevant to this description is shown in FIG. 18 and described in Table 4. Fields not described in the table are not relevant to this description.

TABLE 4

| Field | Purpose | Data Type |
| --- | --- | --- |
| dh_fnode | Fibonacci heap node | Pointer |
| IS-IS TENT Data | Fields for IS-IS | Various |

The dh_fnode field maintains the state of the destination with respect to TENT. A global counter is incremented before each iteration of the shortest path algorithm. When a destination is placed in TENT its dh_fnode field is set to the value of the counter. A destination represents, among other things not relevant to this description, any type of vertex found in the graph (a network or router). Each vertex has its own Fibonacci heap node represented in the dh_fnode field.

Two sets of vertices are maintained: TENT and PATHS. The candidate list used in OSPF is loosely analogous to TENT in IS-IS; it contains the set of vertices to which it is not known if the shortest path has been discovered.

The set of vertices (LSPs) in TENT is manipulated in the following parts of the algorithm described starting in section C.2.4:

1) In C.2.5 Step 0, the TENT list is initialized to zero.
2) In C.2.6 Step 1, part (d), a vertex may have its key (metric) changed.
3) In C.2.7 Step 2, part (a), the minimum cost vertex is extracted from TENT.
4) In C.2.7 Step 2, part (a), a vertex may be placed into TENT.

The above list operations may be summarized as initialization, relax-key, extract-minimum, and insert, respectively.

Some benefits of the application of the modified Fibonacci heap algorithm and data structure to the IS-IS TENT list are:

The time required to run the algorithm defined in section C.2.4 to completion is significantly decreased in the presence of a large IS-IS topology.

Due to the decreased running time of the computation, the results may generally be computed more often (leading to more accurate forwarding state) or be given less restrictions (such as being allowed to run without interruption).

Integration with IS-IS

In summary, the Fibonacci heap algorithm is applied to a specific component of the specialized process in link-state protocols such as the IS-IS link-state routing protocol, used to calculate IP routes. The use of the algorithm for the optimization of the algorithm in Section C.2.4 of ISO 10589 results in dramatic scalability improvements and improved operational performance in an IS-IS implementation by reducing the amount of time to compute IP routes in an IS-IS level.

What is claimed is:

1. A method for determining one or more shortest paths through a network portion of a computer network from a source vertex to one or more destination vertices according to a link-state protocol, the method comprising:
  processing a graph representation of the network portion, the graph representation including nodes and edges representing vertices and connections therebetween, respectively
  wherein
    the processing includes operating on the graph representation according to a Dijkstra-like algorithm,
    a subset of the Dijkstra-like algorithm processing includes candidate list processing to maintain and operate upon a candidate list of nodes that have been visited in the Dijkstra-like algorithm processing, and
    the candidate list processing is optimized relative to standard Dijkstra algorithm processing for the link-state protocol;
  maintaining the candidate list of nodes as a Fibonacci heap of Fibonacci nodes, wherein the Fibonacci heap of Fibonacci nodes is stored in a generic format that is independent of the link-state protocol; and
  operating on the Fibonacci heap of Fibonacci nodes to determine one or more shortest paths by processing the Fibonacci heap of Fibonacci nodes according to a particular algorithm that is independent of the link-state protocol, wherein the operating on the Fibonacci heap is performed by a plurality of operations, each of the operations is capable of operating on a plurality of link state protocols,
  wherein the plurality of operations includes an extract minimum operation for extracting a node from the candidate list of nodes that has a minimum cost according to the Dijkstra-like algorithm, and the extract minimum operation is operable for any of the plurality of link state protocols,
  wherein the candidate list processing includes initially accepting a prior-created generic description of the Fibonacci heap of Fibonacci nodes that is independent of the link-state protocols, and
  wherein the initially accepting the prior-created generic description for the Fibonacci heap of Fibonacci nodes includes accepting the prior-created generic description via a generalized application program interface, the generalized application programming interface including interfaces for the plurality of operations.

2. The method of claim 1, wherein the step of processing the Fibonacci heap of Fibonacci nodes includes considering the Fibonacci nodes to determine which nodes to include in the one or more shortest paths.

3. The method of claim 1, wherein the step of processing the Fibonacci heap of Fibonacci nodes includes a relax-key operation performed in an interactive, non-recursive manner.

4. The method of claim 1, including:
  Initially allocating memory for a list of pointers to the Fibonacci nodes,
  wherein the step of operating on the Fibonacci nodes includes maintaining the list of pointers to the Fibonacci nodes.

5. The method of claim 1, wherein the step of operating on the Fibonacci nodes includes accessing a comparison function associated with the Fibonacci heap in a manner that is independent of the particular link-state protocol.

6. The method of claim 1, wherein the plurality of link state protocols includes one or more versions of Open Shortest Path First and one or more versions of IS-IS.

7. The method of claim 6, wherein the plurality of operations includes an initialization operation for initializing the candidate list on the Fibonacci heap, wherein the initialization operation is operable on each of the plurality of link state protocols.

8. The method of claim 7, wherein the plurality of operations includes an insertion operation, for inserting a new node in the candidate list, wherein the new node may corresponds to the any of the plurality of link state protocols.

* * * * *